(12) United States Patent
Mizutani et al.

(10) Patent No.: US 6,339,733 B1
(45) Date of Patent: Jan. 15, 2002

(54) AUTOMATIC MAIN DISTRIBUTING FRAME CONTROL SYSTEM

(75) Inventors: Takashi Mizutani; Masaaki Muraai, both of Yokohama; Hitoshi Isobe, Kawasaki; Atsuhiro Makino, Yokohama; Masahiro Ito, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/170,941

(22) Filed: Oct. 13, 1998

(30) Foreign Application Priority Data

Feb. 25, 1998 (JP) .......................................... 10-043273

(51) Int. Cl.⁷ .............................................. G06F 19/00
(52) U.S. Cl. ............ 700/245; 318/568.12; 318/568.14; 318/568.16; 318/560; 318/561; 318/569; 439/45; 439/46; 439/48; 439/75; 385/16; 385/17; 385/19; 385/20; 29/739; 29/740; 29/741; 29/742; 29/743; 29/744
(58) Field of Search ..................... 700/245; 318/568.12, 318/568.14, 568.16, 560, 569, 561; 439/48, 75, 45, 46; 361/803; 305/17, 16, 25, 135, 20, 63, 137, 22, 71, 19; 29/739–744

(56) References Cited

U.S. PATENT DOCUMENTS 5,017,145 A * 5/1991 Kanai et al. ................... 439/45
5,204,921 A * 4/1993 Kanai et al. ................... 385/17

(List continued on next page.)

FOREIGN PATENT DOCUMENTS

| JP | 09098452 A | * | 9/1992 |
| JP | 40429993 A | * | 9/1992 |
| JP | 06181584 A | * | 6/1994 |
| JP | 6-339165 | | 12/1994 |
| JP | 09098451 A | * | 3/1997 |
| JP | 11302732 A | * | 11/1999 |

OTHER PUBLICATIONS

Yoshida et al., A New Automated Main Distributing Frame System Using Robot, IEEE, pp. 0977–0982, 1991.*
Umenura et al., Design of High Density Pin Board Matrix Switches for Automated Main Distributing Frame System, IEEE, pp. 266–277, 1992.*
Kanai et al., High Density Pin Board Matrix Switches for Automated MDF Systems, IEEE., pp. 893–903, 1992.*
Kanai et al., Automated Optical Main–Distributing–Frame System, IEEE., pp. 1986–1992, 1994.*

Primary Examiner—William A. Cuchlinski, Jr.
Assistant Examiner—McDieunel Marc
(74) Attorney, Agent, or Firm—Rosenman & Colin LLP (57) ABSTRACT

It is provided an automatic MDF control system comprising: a plurality of matrix boards provided with openings in locations where a plurality of first wires and second wires cross without electrical connections; a robot which inserts electrically conductive connecting pins into the openings and connects the first wires with the second wires where the pins are inserted; a path data conversion unit converting connection requests from an operating terminal into path data having a plurality of addresses of the openings; a robot command conversion unit receiving the path data and converting the path data into robot commands for controlling activity of the robot as a distance moved by the robot moving between the plurality of addresses being reduced by a selected sequence of the converted path data; and a robot control unit controlling the activity of the robot based on the robot commands. In this way, when path data is converted into robot commands, the addresses of the openings of the matrix boards contained in the path data are re-listed as the distance moved by the robot is, for example, as short as possible and therefore wasteful movement by the robot is avoided.

7 Claims, 9 Drawing Sheets

U.S. PATENT DOCUMENTS

| | | | | |
|---|---|---|---|---|
| 5,386,485 A | * | 1/1995 | Saito et al. | 385/22 |
| 5,446,810 A | * | 8/1995 | Watanabe et al. | 385/22 |
| 5,504,825 A | * | 4/1996 | Saito et al. | 385/17 |
| 5,581,644 A | * | 12/1996 | Saito et al. | 385/17 |
| 5,613,021 A | * | 3/1997 | Saito et al. | 385/17 |
| 5,661,826 A | * | 8/1997 | Saito et al. | 385/17 |
| 5,790,651 A | * | 8/1998 | Suzuki et al. | 379/327 |
| 5,865,630 A | * | 2/1999 | Nakano | 439/48 |
| 5,870,528 A | * | 2/1999 | Fukuda | 700/245 |
| 5,975,913 A | * | 11/1999 | Wada et al. | 439/45 |
| 5,994,862 A | * | 11/1999 | Ejiri et al. | 318/568.12 |
| 6,138,345 A | * | 10/2000 | Suzuki et al. | 29/739 |

* cited by examiner

AUTOMATIC MAIN DISTRIBUTING FRAME CONTROL SYSTEM

BACKGROUND OF THE INVENTION

1. Field of the Invention

The present invention relates to an automatic main distributing frame (MDF) control system for matrix boards in which the wires on the side of lines from call subscribers and the wires on the side of the subscriber circuit from the subscriber circuit of a switch are disposed orthogonally to one another, wherein robots make line connections by inserting connecting pins in intersection holes (openings) provided at the intersections thereof; and in particular it relates to an automatic MDF control system whereby the activity of robots corresponding to connection requests is controlled in nonreal-time.

2. Description of the Related Art

Connections between the wires on the side of lines from telephone subscribers and the wires on the side of the subscriber circuit from the subscriber circuit side of a switch need to be altered due to factors such as new installation, removal, re-housing and translocation of telephone equipment. Therefore, use is made of a MDF (Main Distributing Frame) whereby connections are altered by means of jumper leads. Because the work of altering connections in a MDF using such jumper leads has previously involved manual work, productivity has been poor. Also, because this has required on-site working, there have been problems in that a workman or woman has had to be sent even to places such as unmanned stations on remote islands, and working costs have been large.

Thus an automatic MDF device has been adopted in which the line-side wires and subscriber-circuit-side wires are orthogonal to one another via an insulated board, connection holes (openings) have been formed at their intersections, and electrically conductive connection pins have been inserted therein, so constituting a matrix board in which connections are made between orthogonal wires, and which MDF device controls the system in such a way that connecting pins are inserted and withdrawn by a robot.

With this automatic MDF device, a substantial amount of jumper work is facilitated by sending a connection request for robot control from an operating terminal, and efficient working becomes possible by remote control in unmanned stations and elsewhere.

Figure 7:
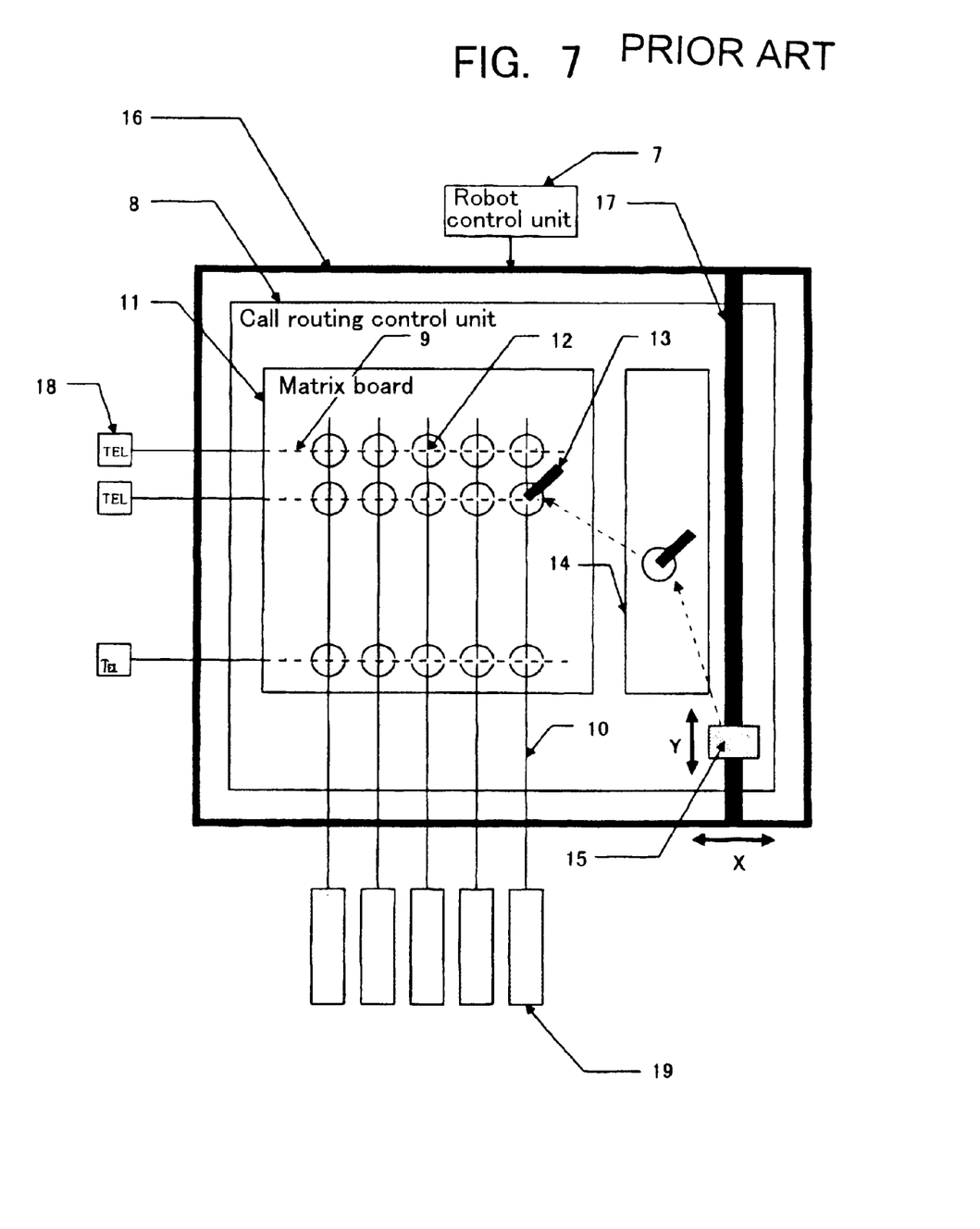
FIG. 7 is an outline configurational diagram of an automatic MDF device.

FIG. 7 is an outline configurational diagram of an automatic MDF device. In FIG. 7, in the matrix board 11, the line-side wires 9 led into the automatic MDF device from subscriber telephones 18, and the subscriber circuit-side wires 10 led into the automatic MDF device from subscriber circuits 19 of the switch are disposed orthogonally to one another. Also, connection between orthogonal wires can be achieved by inserting a connecting pin 13 into an intersection hole 12 (same as the connection hole) formed at an intersection.

Further, a call-routing control unit 8 comprises a plurality of matrix boards 11 and a connecting-pin placement area 14 in which are mounted connecting pins 13 of a number sufficient to connect all the line-side wires 9 and all the subscriber circuit-side wires 10. Further, as designated by a robot control unit 7, a robot unit 15 having a mechanism for gripping the connecting pins 13 has the function of moving in two directions which are orthogonal to one another (the X and Y directions) using a robot frame 16 and a slide unit 17 as rails, and inserting a connecting pin 13 into the intersection hole 12 located at the address designated.

Consequently, a predetermined connecting pin 13 corresponding to the intersection address on the connecting-pin placement area 14 is withdrawn, and the connecting pin 13 is inserted in the intersection hole 12 located at the designated address on the matrix board 11, thereby making it possible to establish a connection between a subscriber telephone 18 and a subscriber circuit 19 of the switch.

Figure 8:
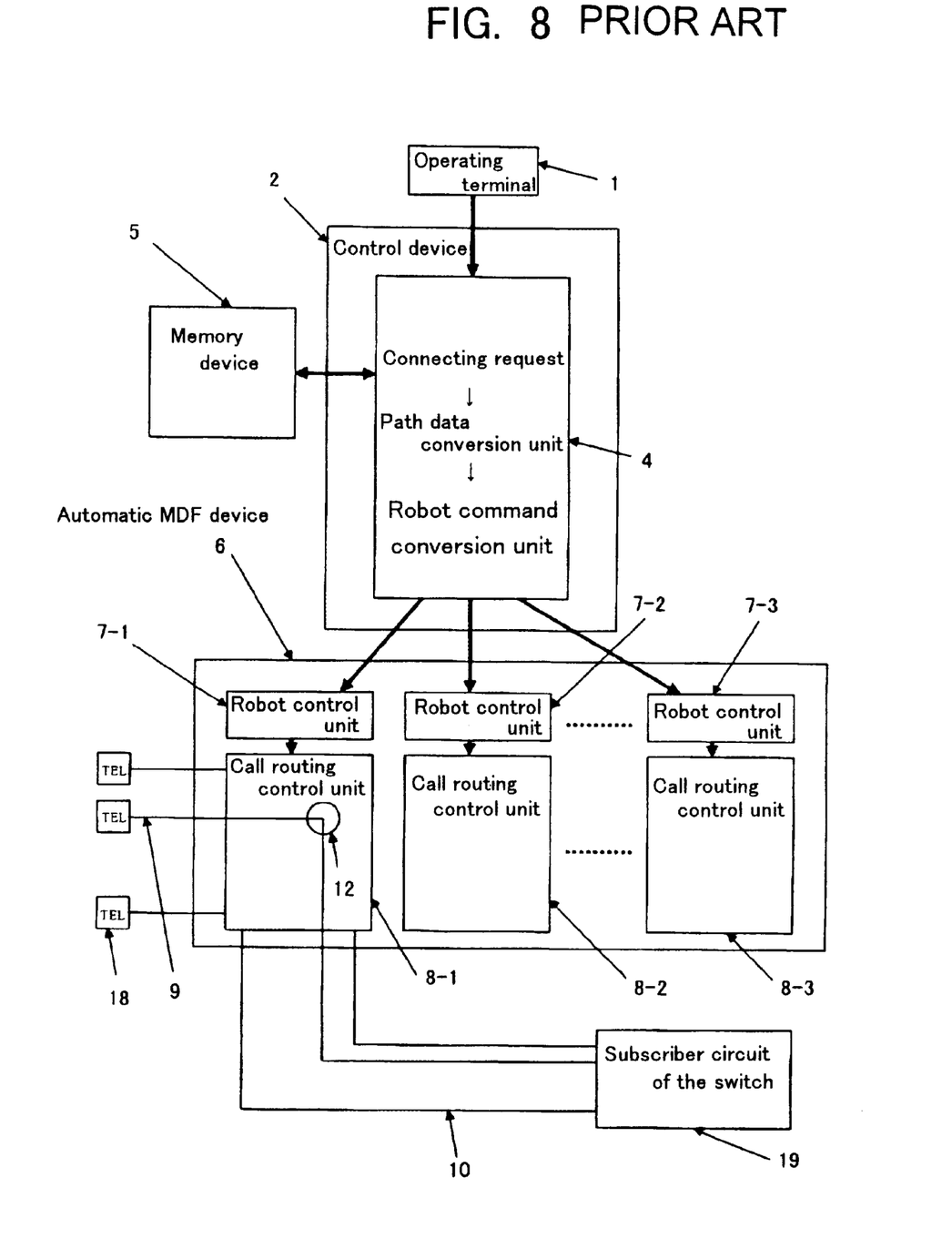
FIG. 8 is a configurational diagram of a conventional automatic MDF control system.

FIG. 8 is a configurational diagram of a conventional automatic MDF control system. In FIG. 8, when a request for connection of a subscriber telephone 18 and the subscriber circuit 19 of the switch is sent from an operating terminal 1, then, in the control device 2, a robot command to acquire a connecting pin 13 from the connecting-pin placement area 14, and a robot command to insert the connecting pin 13 in the intersection hole 12 where the relevant subscriber telephone 18 is connected with the subscriber circuit 19 of the switch, are generated by means of a robot-command conversion mechanism 4 which converts connection requests into robot commands for controlling the activity of a robot.

At this time, when the connection request is converted into robot commands, the connection request is initially converted into path data having address data of an intersection hole 12, and the robot commands are generated based on this path data.

The robot commands which are generated are transmitted to robot control units 7-1, 7-2 and 7-3 respectively responsible for a plurality of call-routing control units 8-1, 8-2 and 8-3 having a matrix board 11 equipped with the relevant intersection hole 12.

Figure 9A:
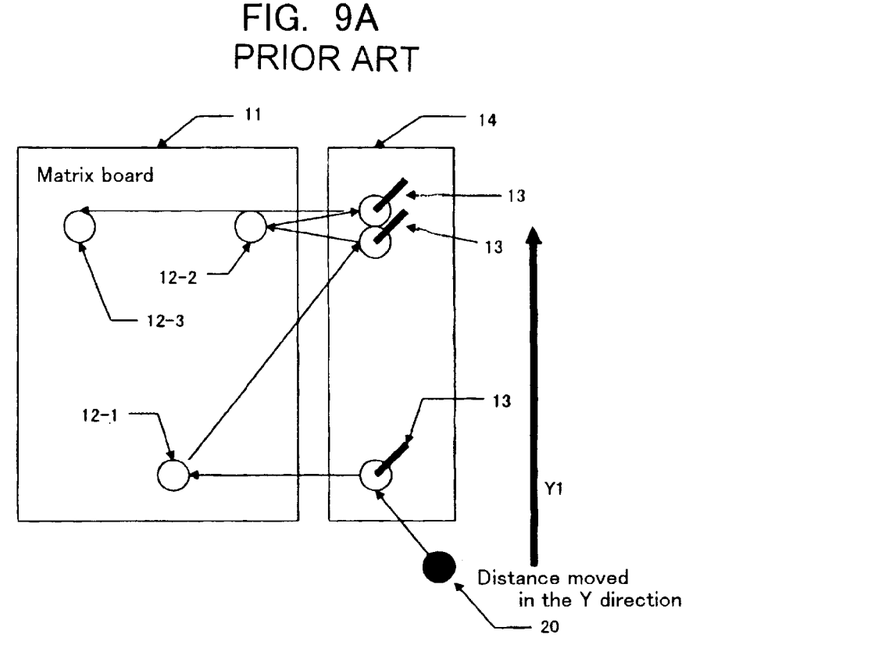
FIGS. 9A, B illustrate the pin-manipulation method in a conventional automatic MDF control system.
Figure 9B:
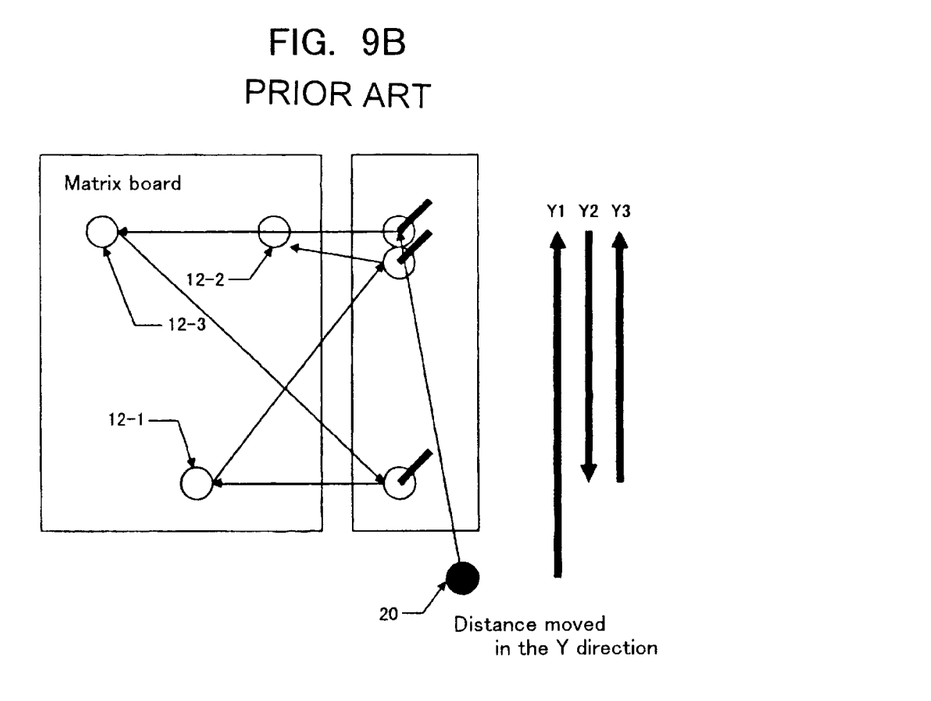

FIGS. 9A, B illustrate the pin-manipulation method in a conventional automatic MDF control system. In the pin-manipulation method in the conventional automatic MDF control system, robot commands are generated in real-time. To elaborate, as shown in FIG. 9A, when connection requests are produced in the sequence intersection hole 12-1, 12-2, 12-3, then a robot which is not depicted moves from the home position 20 in one direction in the Y direction (Arrow Y1) in such a way that connecting pins 13 are inserted in the sequence of the connection requests.

However, when, for example, connection requests are produced in the sequence intersection hole 12-3, 12-1, 12-2 as shown in FIG. 9B, then, even though the locations and the number of the connecting pins 13 to be inserted are the same, the robot moving from the robot home position 20 moves along the arrows Y1, Y2 and Y3, and thus the distance moved in the Y direction is approximately three times as much as it is in FIG. 9(A). In other words, there is wasteful distance moved by the robot (ineffective distance moved) depending on the order of the connection requests.

In particular, connection requests for several thousand units of already installed subscribers continue to be made while the task of introduction of an automatic MDF device is underway. However, there are problems in that, depending on the state of the already installed subscribers, there will be occasions when the ineffective distance moved by the robot increases and the length of the task is extended, and costs of introducing an automatic MDF device are increased.

While there is a method for increasing the speed of activity of the robot in order to reduce the length of the task, in this method an increase in the driving force of the robot presents economic problems including an elevated price, increase in the power consumption and an increase in scale of the robot.

SUMMARY OF THE INVENTION

Consequently the present invention aims to provide an automatic MDF control system which improves the speed of manipulation of the pins in an automatic MDF device, without presenting such economic problems.

To achieves the above mentioned aim, a first automatic MDF control system of the present invention comprises: a plurality of matrix boards provided with openings in locations where a plurality of first wires and second wires cross without electrical connections; a robot which inserts electrically conductive connecting pins into the openings and connects the first wires and the second wires where the pins are inserted; a path data conversion unit converting connection requests from an operating terminal into path data having a plurality of addresses of the openings; a robot command conversion unit receiving the path data and converting the path data into robot commands for controlling activity of the robot as a distance moved by the robot moving between the plurality of address being reduced by a selected sequence of the converted path data; and a robot control unit controlling the activity of the robot based on the robot commands.

In this way, when path data is converted into robot commands, the addresses of the openings of the matrix boards contained in the path data are re-listed in such a way that the distance moved by the robot is, for example, as short as possible, and therefore wasteful movement by the robot is avoided.

Further, a second automatic MDF control system of the present invention comprises: a plurality of matrix boards provided with openings in locations where a plurality of first wires and second wires cross without electrical connections; a plurality of robots which insert electrically conductive connecting pins into the openings and connects the first wires and the second wires where the pins are inserted; a path data conversion unit converting connection requests from an operating terminal into path data having a plurality of addresses of the openings; a robot command conversion unit receiving the path data and converting the path data into robot commands for controlling activity of the robots, for each of the plurality of the robots moving between the plurality of the addresses; and a robot control unit controlling the activity of the robot based on the robot commands.

In this way, when path data is converted into robot commands, the addresses of all of the items of path data corresponding to the input connection requests are sorted for each robot, and are converted into robot commands in robot units, thereby making it possible to control the robots efficiently. Consequently, these inventions allow the pin insertion and withdrawal times to be greatly reduced without using an expensive robot capable of high-speed insertion and withdrawal activity.

BRIEF DESCRIPTION OF THE DRAWINGS

FIGS. 4A, B illustrate the time taken for the task of introduction in the embodiment of the present invention, and the time taken for the task of introduction in the prior art.

DESCRIPTION OF THE PREFERRED EMBODIMENTS

Embodiments of the present invention are described below. However, the technical scope of the present invention is not limited to these embodiments.

Figure 1:
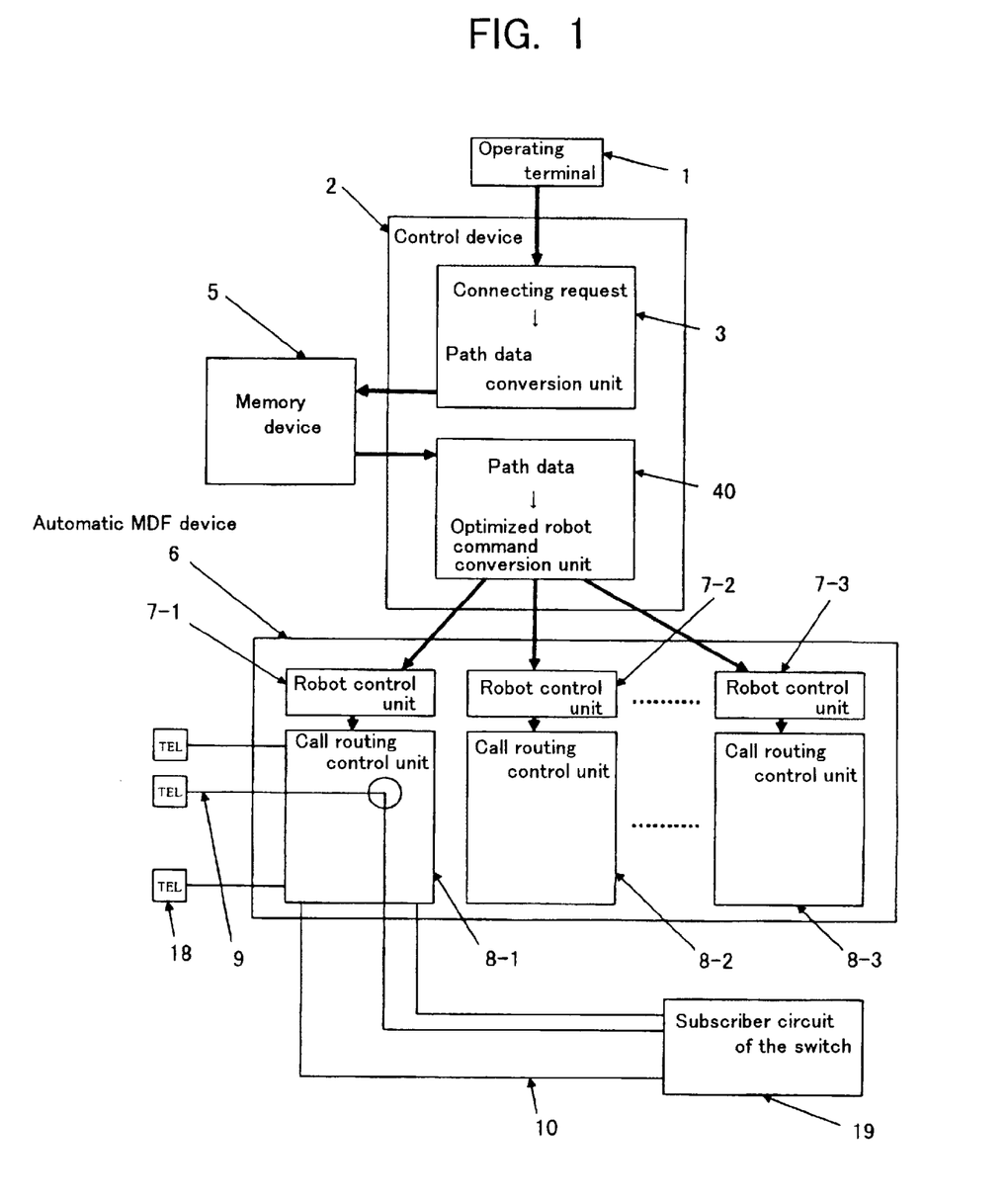
FIG. 1 is a configurational diagram of an automatic MDF control system in an embodiment of the present invention.

FIG. 1 is a configurational diagram of an automatic MDF control system in an embodiment of the present invention. In FIG. 1, when a request for connection of a subscriber telephone 18 and the subscriber circuit 19 of the switch is sent from the operating terminal 1, the connection request is converted into path data by means of a path-data conversion mechanism 3 provided inside the control device 2. The path data is discussed in greater detail below. The converted path data is initially stored in a memory device 5 without being converted into robot commands in real-time as is conventionally done. Then, by inputting a connection start instruction from the operating terminal 1, the path data stored in the memory device 5 is taken out to the optimized robot command conversion mechanism 40.

In addition, in a first embodiment of the present invention, the optimized robot command conversion mechanism 40 converts the path data which has been taken out into robot commands optimized for each item of path data, the optimum robot commands are sent to the robot control units 7-1, 7-2 and 7-3, and the respective call routing control units 8-1, 8-2 and 8-3 are controlled.

Figure 2:
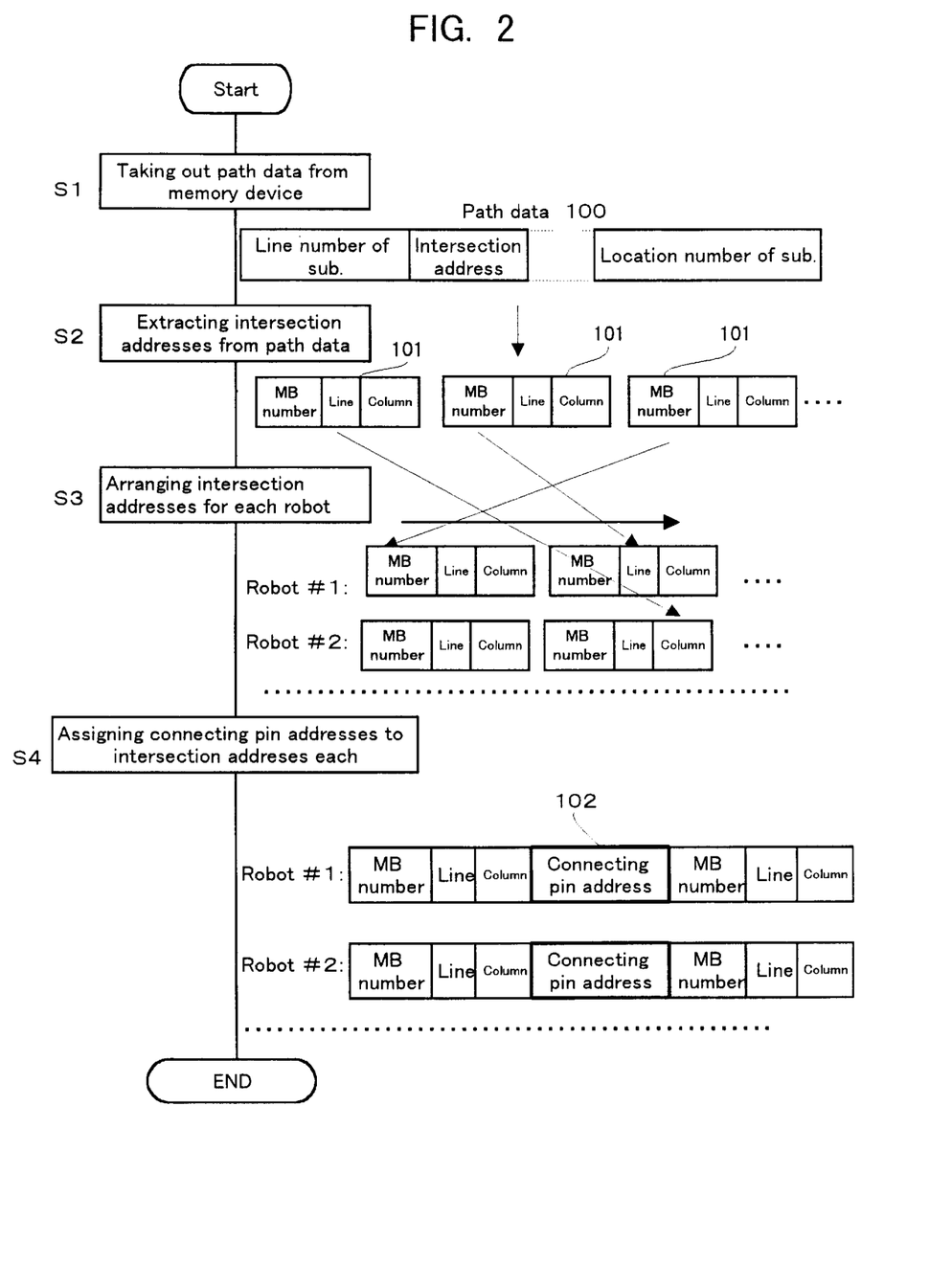
FIG. 2 is an explanatory diagram of an optimized robot command conversion unit 4.

FIG. 2 is an explanatory diagram of the activity of an optimized robot command conversion unit 40. In FIG. 2, in Step S1, stored path data is taken out from the memory device 5. As shown in FIG. 2, the path data 100 comprises the line numbers of the line-side wires 9 of the subscriber telephones 18, the location numbers of the subscriber-side wires 10 of the subscriber circuit 19 of the switch, and intersection addresses which are the addresses of the intersection holes 12 where these are connected. It will be noted that a plurality of intersection addresses will normally be required to make the connection between a single subscriber telephone 18 and a single subscriber circuit 19.

In Step S2, only the intersection addresses are extracted from the path data. As shown in FIG. 2, an intersection address 101 comprises the matrix board (MB) number and the Y coordinate (line) and X coordinate (column) of an intersection hole 12 on the matrix board.

In Step S3, the intersection addresses 101 are arranged for each robot. More specifically, in each of the robots (in robots #1 and #2 in FIG. 2), the intersection addresses 101 are listed, with respect to the direction of movement of each robot, in sequence from the shortest distance in one direction (for example the Y direction) from the home position of the robot.

In Step S4, connecting pin addresses 102, which are the addresses of the connecting pins 13 inserted in the intersection holes 12 at the intersection addresses so arranged, are ascribed to each of the intersection addresses. In selecting a connecting pin 13, the connecting pin 13 which is chosen is located closest to the location of the intersection hole 12, among the connecting pins 13 in the connecting pin placement area 14. More specifically, the distances between the location of the intersection hole 12 and the locations of the connecting pins 13 placed in the connecting pin placement area 14 are computed, and the connecting pin 13 at the closest distance is chosen. Thus the path data is converted into an optimum robot command.

Figure 3:
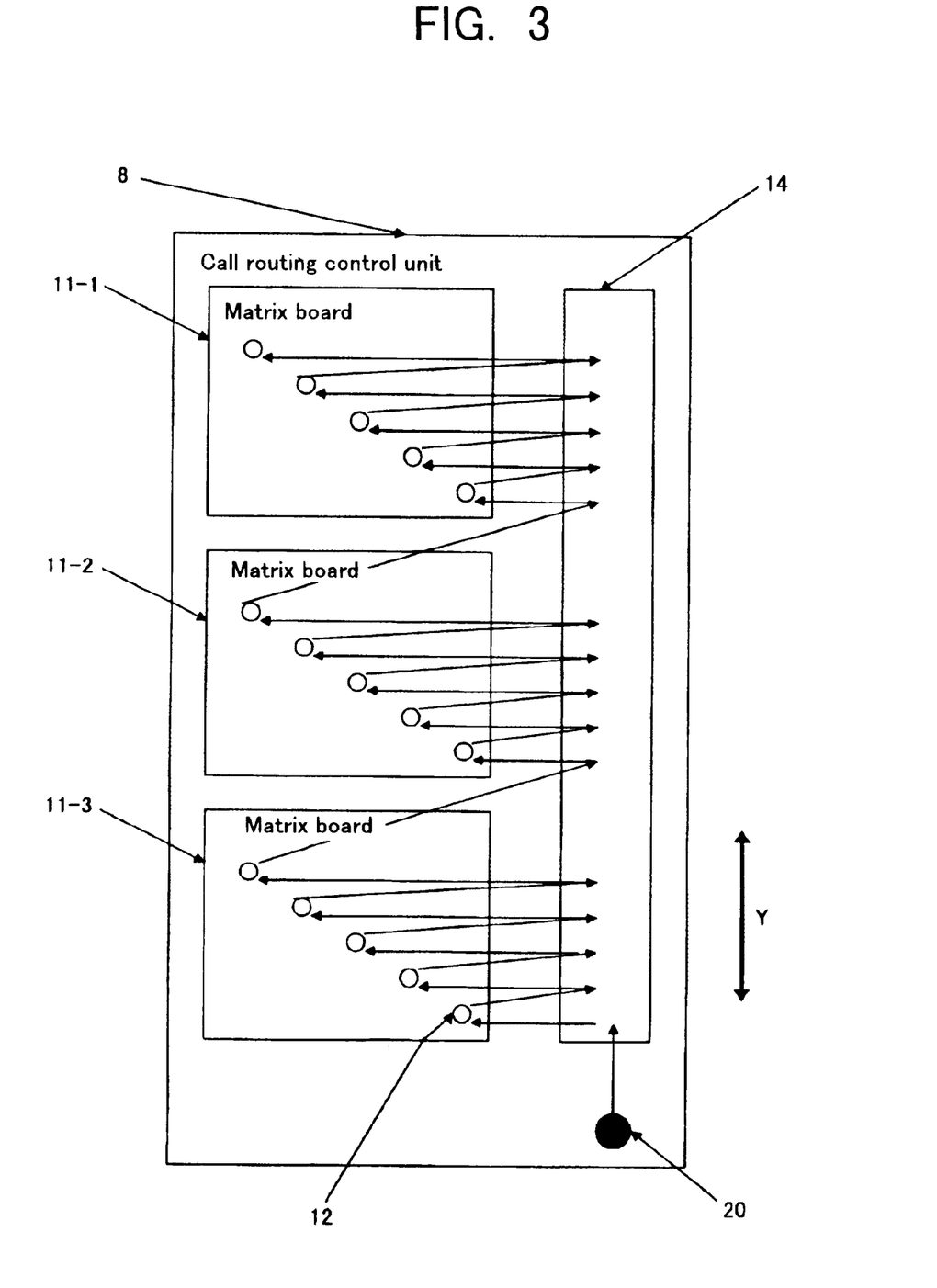
FIG. 3 is an explanatory diagram of the pin-manipulation method in an automatic MDF control system of the embodiment of the present invention.

FIG. 3 is an explanatory diagram of a method of pin insertion and withdrawal in an automatic MDF control system in the embodiment of the present invention. In FIG. 3, a robot which is not depicted but has received optimized robot commands, begins to insert connecting pins, which are not depicted, from the intersection hole 12 at the closest distance from the home position 20 of the robot on a matrix board 11-3, and inserts connecting pins in corresponding intersection holes 12 while moving in sequence in the Y direction. As regards the connecting pins at this time, the connecting pin which is chosen is the connecting pin which is at the closest distance from the intersection hole 12, among the connecting pins in the connecting pin placement area 14. The robot repeats the insertion activity in accordance with optimized robot command(s), and gradually moves from the home position 20 to a more remote matrix board 11-2, and then matrix board 11-1.

This is to say, because the intersection addresses are re-listed optimally by the optimized robot command conversion unit 40, it follows that, in the movement of the robot from the home position 20 in the Y direction, pins are inserted by the robot moving in only one direction without its moving back and-forth.

Moreover, the robot is able not only to insert connecting pins in intersection holes, but also to withdraw connecting pins from intersection holes based on predetermined cut-off requests. Then, in the embodiment of the present invention, path data corresponding to cut-off requests is also initially held in memory in the memory device 5, and the intersection addresses contained in this path data are re-listed in such a way that the distance moved by the robot is as short as possible.

Thus, because the robot inserts and withdraws pins using the shortest movement distance, the task of inserting and withdrawing pins can be completed in a short time. In addition, when a plurality of robots are provided, all of the robots move based on robot commands which have been optimized as discussed above, and therefore the task of introduction can be completed in a short time, even when a substantial amount of pin insertion and withdrawal work is required at one time, as in the task of introduction of an automatic MDF control system.

Figures 4A, 4B:
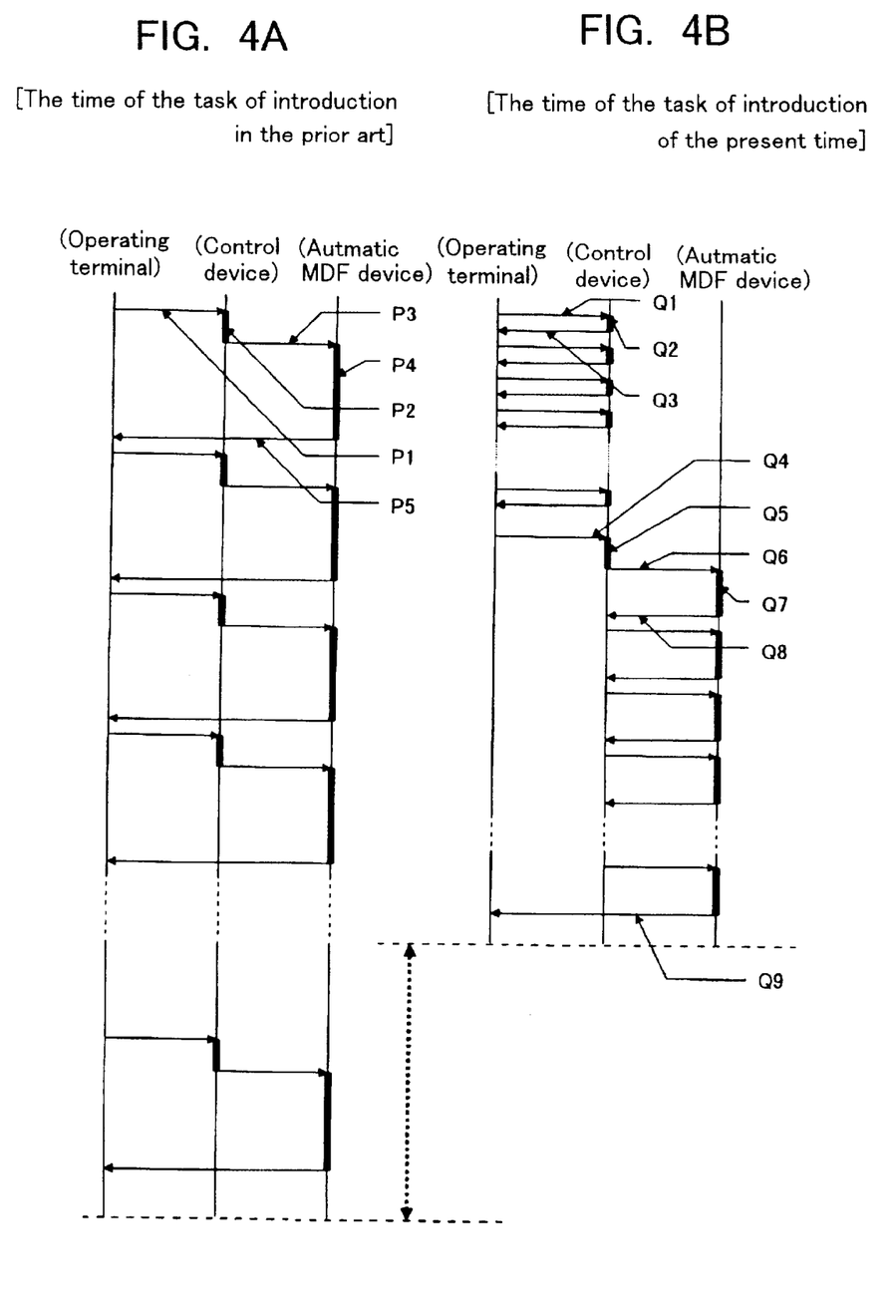

FIGS. 4A, B illustrate the time taken for the task of introduction in the embodiment of the present invention, and the time taken for the task of introduction in the prior art. In the time taken for the task of introduction in the example in the prior art shown in FIG. 4 (A), the first thing that happens is that a connection request P1 is sent from the operating terminal 1 to the control device 2.

The control device 2 takes a time P2 to convert the connection request into path data and convert the path data into a robot command. Then, the robot command P3 is sent to the automatic MDF device 6. A robot in the automatic MDF device 6 which has received the robot command P3 is activated over the time P4. At this time, because optimization processing of the type discussed above is not carried out for the robot command P3, the time P4 is long because it includes wasted activity time of the robot. When the activity of the robot ends, connection-request-completion notification P5 is sent from the automatic MDF device 6 to the operating terminal 1. This series of processes is carried out to. the number of times that there are connection requests, which is to say of path data.

On the other hand, in the time of the task of introduction of the embodiment of the present invention shown in FIG. 4 B, when a connection request Q1 is sent from the operating terminal 1 to the control device 2, t he control device 2 takes a time Q2 to convert the connection request to path data and then send subsequent-connection request-reception-possible notification Q3 to the operating terminal 1. When the operating terminal 1 receives this notification Q3, a subsequent connection request is sent from the operating terminal 1. Thus, in the embodiment of the present invention, all of the connection requests needed for pin manipulation are first sent one after another before starting robot activity. It will be noted that, the converted path data is stored in the memory device 5 as discussed above.

When the sending of the connection requests has been completed, a connection-start instruction Q4 is sent from the operating terminal 1 to the control device 2. The control device 2, when it has received the connection-start instruction Q4, reads out the path data held in memory in the memory device 5, and converts it into optimum robot commands over a period of time Q5. Then, when the conversion process has been completed, the control device 2 sends optimum robot commands Q6 to the automatic MDF device 6. Because the optimum robot commands Q6 are generated in such a way that the distance moved by the robot is as short as possible, corresponding to each item of path data, it follows that the robot activity time Q7 in an automatic MDF device 6 which has received the optimum robot commands Q6 is substantially shorter than the robot activity time P4 in the example in the prior art.

Upon completion of robot activity due to robot commands corresponding to a single item of path data, the automatic MDF device 6 gives the control device 2 robot-command-reception-possible notification Q8. Further, upon completion of robot activity corresponding to all the robot commands Q6, an all-pin-insertion-and-withdrawal-complete notification Q9 is sent to the operating terminal 1.

In this way, in a first embodiment of the present invention, robot commands corresponding to connection requests sent from the operating terminal 1, which is operated by an operator, are not sent in real-time upon every single connection request, but rather connection requests are initially converted into path data and stored in a memory device 5. Then, all the connection requests can be input before starting robot activity. Consequently, the operator of the operating terminal 1 is not occupied for reasons of operation of the operating terminal 1 over a long time, in order to input connection requests.

More specifically, robot commands are generated for each connection request which is sent, the operator is able to send subsequent connection requests without waiting for the completion of pin insertion and withdrawal activities by the robot in response to such robot commands, and the time required for the operator to send all of the connection requests can be reduced.

In addition, because the intersection addresses contained in the path data are re-listed and are sent to the automatic MDF device 6 as optimum robot commands, in such a way that the distance moved by the robot is as short a distance as possible, when the path data stored in the memory device 5 is converted into robot commands, it follows that the time over which the robot is active is also substantially reduced.

By way of example, the actual manipulation time will now be calculated for a case involving pin manipulation for 4,000 subscribers and a switch. In the example in the prior art in FIG. 4 A, approximately 5 seconds will be assumed to be required for each connection request in the time P2 needed to convert a connection request into path data and then into robot commands. Further, approximately 45 seconds will be assumed to be required for each connection request in the robot activity time P4. Consequently, approximately 56 hours is required to complete the task of introduction for 4,000 subscribers, and the operator who operates the operating terminal 1 is also occupied for approximately 56 hours.

With the embodiment of the present invention, for its part, it takes approximately 5 seconds for each connection request in the time Q2 when connection requests are converted into path data, which is more or less the same as the time P2 above. However, because the 4,000 connection requests can be input before starting robot activity, the inputting of connection requests for 4,000 subscribers is ended in approximately 6 hours. Thus the operator who operates the operating terminal 1 is only occupied for approximately 6 hours in inputting connection requests.

In addition, when the connection-start instruction Q4 is sent, optimum robot commands Q6 corresponding to the path data are sent in turn after approximately two minutes, which is the time Q5 over which the path data is converted to optimum robot commands. Also, the time Q7 over which the robot is active due to the optimum robot commands Q6 is reduced to an average of approximately 20 seconds. This is to say, since optimum robot commands Q6 continue to be sent every 20 seconds approximately, the all-pin-insertion-and-withdrawal-complete notification Q9 is sent to the operating terminal 1 after approximately 22 hours.

Consequently, when the 6 hours constituted by the connection request inputting time are added together with the approximately 22 hours constituted by the robot activity time, the task of introduction is completed in approximately 28 hours in the embodiment of the present invention. This is to say, the time taken by the task of introduction is reduced to about half as compared with the time of the task of introduction in the prior art.

Further, in the embodiment of the present invention, in situations in which a plurality of robots are activated by robot commands corresponding to a single connection request, the insertion-and-withdrawal time for a single connection request is the time over which the robot with the longest activity time is activated. Consequently, in the task of introduction, the greater the number of connecting pins to be inserted and withdrawn, the greater the advantages of the embodiment of the present invention.

A second embodiment of the present invention will now be described. The optimum robot commands in the first embodiment discussed above involved conversion for each item of path data, but, in this second embodiment, all of the path data stored in the memory device 5 is divided into intersection addresses. Then the divided intersection addresses are reorganized for each robot and converted into the optimum robot commands for each robot.

Figure 5:
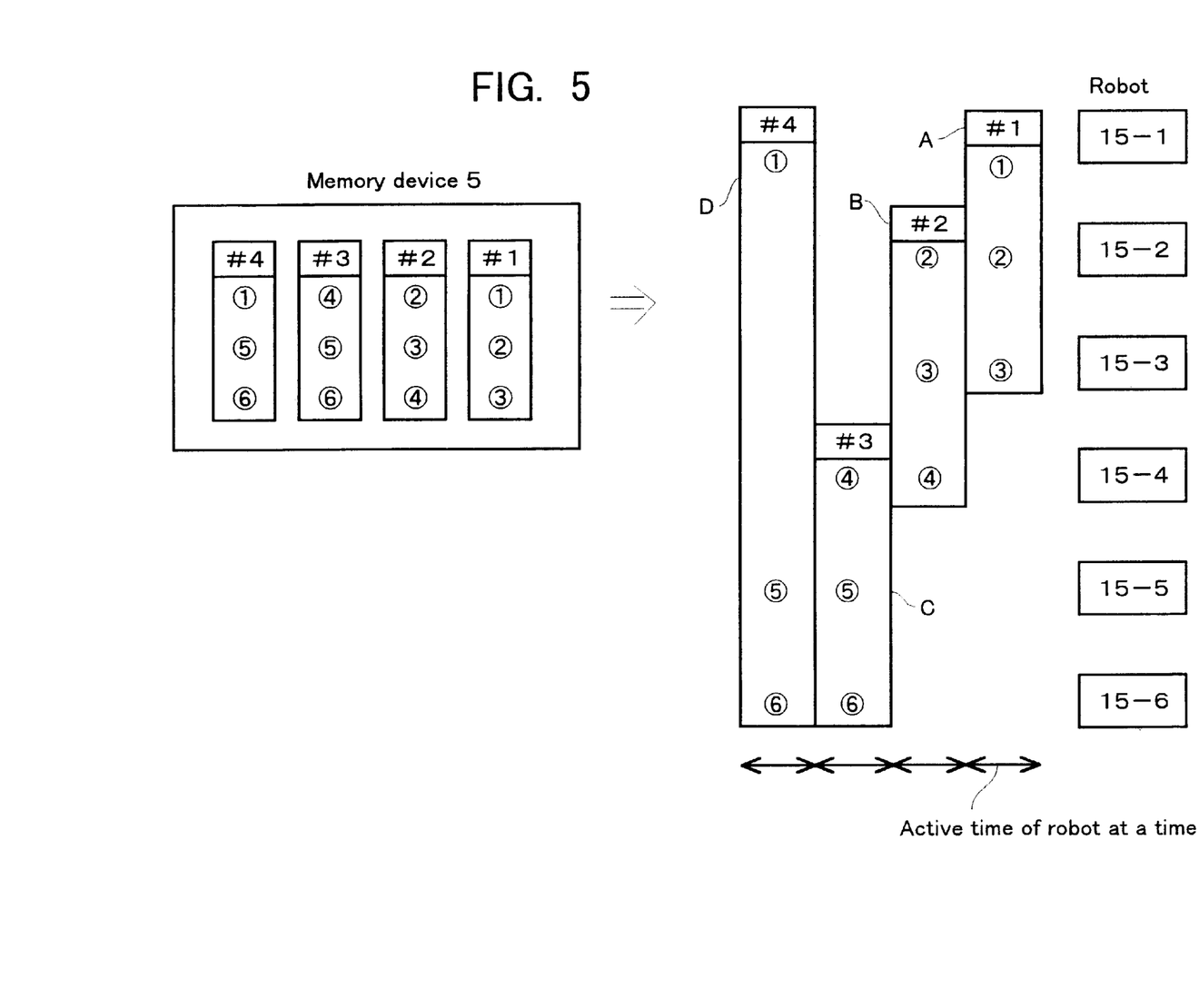
FIG. 5 is a schematic diagram showing optimum robot commands corresponding to a plurality of items of path data in a first embodiment.

The second embodiment is described in greater detail while being compared with the first embodiment. FIG. 5 is a schematic diagram showing robot commands corresponding to a plurality of items of path data in the first embodiment. As shown in FIG. 5, the optimum robot command conversion unit 40 generates optimum robot commands based on a single item of path data corresponding to a single connection request. For example, the automatic MDF device is equipped with six robots 15-1, 15-2, 15-3, 15-4, 15-5 and 15-6, the robots 15-1, 15-2 and 15-3 are activated by means of an optimum robot command A based on path data #1 corresponding to a first connection request; the robots 15-2, 15-3 and 15-4 are activated by means of an optimum robot command B based on path data #2 corresponding to a second connection request; robots 15-4, 15-5 and 15-6 are activated by means of an optimum robot command C based on path data #3 corresponding to a third connection request; and robots 15-1, 15-5 and 15-6 are activated by means of an optimum robot command D based on path data #4 corresponding to a fourth connection request. It should be noted that the encircled numbers (1), (2), (3), (4), (5) and (6) in the path data denote groups of intersection addresses in which the intersection addresses contained in each item of path data have been collated for each robot, and these numbers respectively correspond to robots 15-1, 15-2, 15-3, 15-4, 15-5 and 15-6.

Now, in the first embodiment, the optimum robot command B is executed after having executed the optimum robot command A. Then the optimum robot commands C and D are executed in turn.

When the optimum robot command A is executed, the robots 15-4, 15-5 and 15-6 are in the wait mode. However, since these robots will all assume an activated mode due to the optimum robot commands B, C and D which are sent in turn after executing the optimum robot command A, it is inefficient to have them in the wait mode while executing the optimum robot command A.

Figure 6:
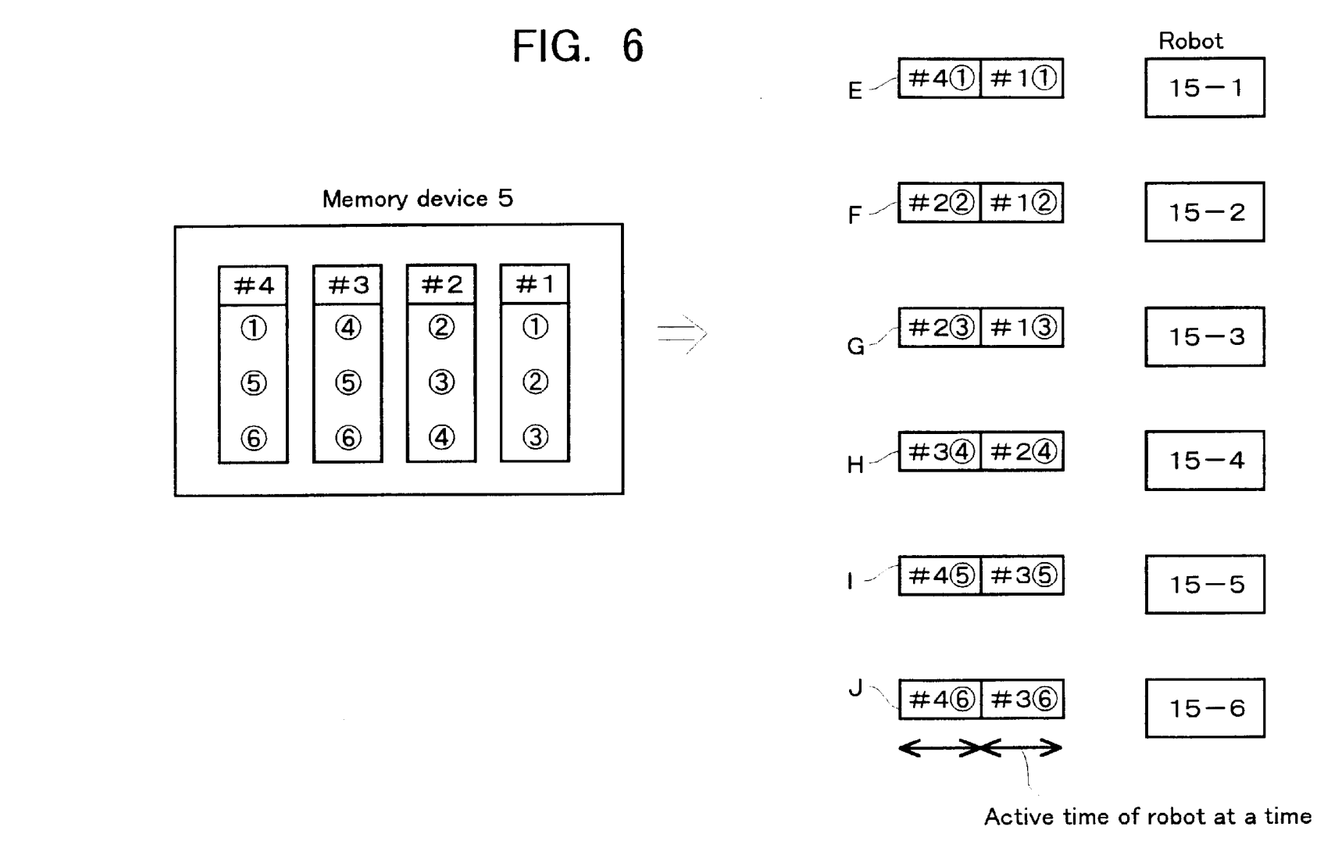
FIG. 6 is a schematic diagram showing optimum robot commands corresponding to a plurality of items of path data in a second embodiment.

Thus, in the second embodiment of the present invention, the intersection addresses contained in the path data #1 through #4 are all reorganized for each robot, and converted into optimum robot commands E, F, G, H, I and J in robot units described below. FIG. 6 is a schematic diagram showing optimum robot commands corresponding to a plurality of items of path data in the second embodiment. As shown in FIG. 6 (a), the optimum robot conversion unit 40 divides path data #1 through #4 into intersection address groups #1 (1), #1 (2), #1 (3), #2 (2), 190 2 (3), #2 (4), #3 (4), #3 (5), #3 (6), #4 (1), #4 (5) and #4 (6), in which the intersection addresses in all of them are collated for each robot. Then the divided intersection address groups are reorganized for each robot and converted into optimum robot commands E, F, G, H, I and J for each robot. This is to say, the optimum robot command E for the robot 15-1 is converted based on the intersection address group #1 (1) and #4 (1); the optimum robot command F corresponding to the robot 15-2 is converted based on the intersection address group #1 (2) and #2 (2); the optimum robot command G corresponding to the robot 15-3 is converted based on the intersection address group #1 (3) and #2 (3); the optimum robot command H corresponding to the robot 15-4 is converted based on the intersection address group #2 (4) and #3 (4); the optimum robot command I corresponding to the robot 15-5 is converted based on the intersection address group #3 (5) and #4 (5); and the optimum robot command J corresponding to the robot 15-6 is converted based on the intersection address group #3 (6) and #4 (6). Then, the optimum robot commands E, F, G, H, I and J are respectively sent to the robots all at once.

Consequently, in this second embodiment, optimum robot commands are also sent to those robots to which optimum robot commands were not sent in the first embodiment discussed above (robots 15-4, 5 and 6 in FIG. 5), and efficient robot control is carried out without waste. In this way, the optimum robot command conversion unit 40 is able to classify the intersection addresses of all of the path data held in memory in the memory device 5, for each robot, and convert them into optimum robot commands of robot units, thereby efficiently controlling the activities of a plurality of robots. For example, as is clear from FIG. 5 and FIG. 6, the time over which the robots are active due to the optimum robot commands E through J in FIG. 6 is roughly half of the time over which the robots are active due to the optimum robot commands A through D in FIG. 5.

Moreover, the plurality of intersection addresses constituting an intersection address group are re-listed and converted into robot commands in such a way that the distance moved by the robot is as short as possible, according to the first embodiment discussed above, thus making it possible to further reduce the time over which the robot is active.

Further, in the above mentioned embodiments of the present invention, the path data need not be initially held in memory in the memory device 5, and the intersection addresses contained in the path data may be re-listed in optimum fashion as discussed above when the path data is converted into robot commands for each connection request from the operating terminal 1. Again, path data corresponding to connection requests may be converted into robot commands in robot units for each of the connection requests, and robot commands in robot units may be sent to the respective robots.

Further, connection requests from the operating terminal 1 may be held in memory in the memory device 5, instead of path data. In this case, a plurality of connection requests held in memory are read out based on predetermined orders from the operating terminal 1. After this, the connection requests read out are converted into path data and then into robot commands.

As described above, with an automatic MDF control system of the present invention, the operator who operates the system can send subsequent connection requests without waiting for the completion of pin insertion and withdrawal activity by a robot in accordance with robot commands for a single connection request which has been sent, and the activity of the robot begins after all of the connection requests have been input. Consequently, the time required for an operator to send all the connection requests can be reduced, and the operator is no longer occupied in operating the operating terminal for a long time in order to input connection requests.

Further, when the path data is converted to robot commands, address data of the intersection holes of matrix boards included in the path data is re-listed in such a way that the action of the robot is as short as possible, and thus wasteful movement of the robot is avoided.

Further, when path data is converted to robot commands, address data of all the path data corresponding to the input connection requests is reorganized for each robot, and converted into robot commands in robot units, thereby making it possible to control the robots efficiently. Consequently, pin insertion and withdrawal time can be substantially reduced even using an inexpensive, low-speed, small-scale robot and without using an expensive robot capable of high-speed insertion and withdrawal activity.

What is claimed is:

1. An automatic MDF control system comprising:
   a plurality of matrix boards provided with openings in locations where a plurality of first wires and second wires cross without electrical connections;
   a robot which inserts electrically conductive connecting pins into the openings and connects the first wires with the second wires where the pins are inserted;
   a path data conversion unit converting connection requests from an operating terminal into path data having a plurality of addresses of the openings;
   a robot command conversion unit receiving the path data and converting the path data into robot commands for controlling activity of the robot as a distance moved by the robot moving between the plurality of addresses being reduced by a selected sequence of the converted path data; and
   a robot control unit controlling the activity of the robot based on the robot commands,
      wherein the robot chooses the connecting pin located closest from the opening among the connecting pins in a predetermined placement area when inserting the pins into the openings corresponding to the addresses included in the path data.

2. The automatic MDF control system according to claim 1, further comprising:
   a memory unit memorizing the path data; and
      wherein the robot command conversion unit converts the path data memorized in the memory unit into the robot commands based on a predetermined command from the operating terminal.

3. An automatic MDF control system comprising:
   a plurality of matrix boards provided with openings in locations where a plurality of first wires and second wires cross without electrical connection;
   a plurality of robots which insert electrically conductive connecting pins into the openings and connect the first wires with the second wires where the pins are inserted;
   a path data conversion unit converting connection requests from an operating terminal into path data having a plurality of addresses of the openings;
   a robot command conversion unit receiving the path data and converting the path data into robot commands for controlling activity of the robots, for each of the plurality of robots moving between the plurality of addresses; and
   a robot control unit controlling the activity of the plurality of robots based on the robot commands,
      wherein the robot chooses the connecting pin located closest from the opening among the connecting pins in a predetermined placement area when inserting the pins into the openings corresponding to the addresses included in the path data.

4. The automatic MDF control system according to claim 3, wherein the robot command conversion unit converts path data into robot commands for controlling the activity of the robot as a distance moved by the robot moving between the plurality of addresses being reduced by a selected sequence of the converted path data.

5. The automatic MDF control system according to claim 3, further comprising:
   a memory unit memorizing the path data; and wherein the robot command conversion unit converts the path data memorized in the memory unit into the robot commands based on a predetermined command from the operating terminal.

6. An automatic MDF control system comprising:
   a plurality of matrix boards provided with openings in locations where a plurality of first wires and second wires cross without electrical connection;
   a plurality of robots which insert electrically conductive connecting pins into the openings and connect the first wires with the second wires where the pins are inserted;

a path data conversion unit converting connection requests from an operating terminal into path data having a plurality of addresses of the openings;

a robot command conversion unit receiving the path data and converting the path data into robot commands for controlling activity of the robots, for each of the plurality of robots moving between the plurality of addresses; and a robot control unit controlling the activity of the plurality of robots based on the robot commands, wherein the robot command conversion unit converts path data into robot commands for controlling the activity of the robot as a distance moved by the robot moving between the plurality of addresses being reduced by a selected sequence of the converted path data, and wherein the robot chooses the connecting pin located closest from the opening among the connecting pins in a predetermined placement area when inserting the pins into the openings corresponding to the addresses included in the path data.

7. The automatic MDF control system according to claim 6, further comprising:

a memory unit memorizing the path data; and wherein the robot command conversion unit converts the path data memorized in the memory unit into the robot commands based on a predetermined command from the operating terminal.

* * * * *